United States Patent
Bialer et al.

(10) Patent No.: US 11,047,971 B2
(45) Date of Patent: Jun. 29, 2021

(54) RADAR SYSTEM AND CONTROL METHOD FOR USE IN A MOVING VEHICLE

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 227 days.

(21) Appl. No.: 16/416,927

(22) Filed: May 20, 2019

(65) Prior Publication Data
US 2020/0371224 A1 Nov. 26, 2020

(51) Int. Cl.
G01S 13/58 (2006.01)
G01S 13/931 (2020.01)
G01S 13/02 (2006.01)
G01S 13/42 (2006.01)

(52) U.S. Cl.
CPC ............ *G01S 13/58* (2013.01); *G01S 13/931* (2013.01); *G01S 13/424* (2013.01); *G01S 2013/0245* (2013.01)

(58) Field of Classification Search
CPC ........ G01S 13/06; G01S 13/42–13/428; G01S 13/4418; G01S 13/931; G01S 2013/0245
See application file for complete search history.

(56) References Cited

U.S. PATENT DOCUMENTS

| | | | | |
|---|---|---|---|---|
| 5,448,244 A | * | 9/1995 | Komatsu | G01S 13/424 342/155 |
| 8,289,203 B2 | * | 10/2012 | Culkin | H01Q 21/061 342/73 |
| 8,665,137 B2 | * | 3/2014 | Wintermantel | H01Q 9/0407 342/59 |
| 8,797,208 B2 | * | 8/2014 | Stirling-Gallacher | G01S 13/34 342/179 |
| 9,121,943 B2 | * | 9/2015 | Stirling-Gallacher | G01S 13/885 |
| 9,203,160 B2 | * | 12/2015 | Blech | H01Q 21/061 |
| 10,048,366 B1 | * | 8/2018 | Hong | G01S 13/003 |
| 2010/0123616 A1 | * | 5/2010 | Minami | G01S 7/4021 342/147 |
| 2015/0198704 A1 | * | 7/2015 | Schoor | G01S 13/424 342/147 |

(Continued)

*Primary Examiner* — Peter M Bythrow
(74) *Attorney, Agent, or Firm* — Cantor Colburn LLP

(57) ABSTRACT

A radar system for use in a vehicle moving in a first direction may include a plurality of antenna elements spaced apart in a second direction; and a controller operably connected to the plurality of antenna elements. The controller may be configured record signals received by each antenna element at each time instant of a plurality of time instants; calculate a position in the first direction of each antenna element for each time instant based on a velocity hypothesis; calculate a virtual two-dimensional antenna array response based on the signal received by each antenna element at each time instant and the position in the first direction of each antenna element at each time instant; calculate a beamforming spectrum based on the virtual two-dimensional antenna array response; and identify a peak in the beamforming spectrum to identify an elevation angle from the vehicle to a target relative to the first direction.

20 Claims, 17 Drawing Sheets

(56) References Cited

U.S. PATENT DOCUMENTS

| | | | |
|---|---|---|---|
| 2015/0198705 A1* | 7/2015 | Schoor | G01S 13/424 |
| | | | 342/147 |
| 2015/0253419 A1* | 9/2015 | Alland | G01S 13/4463 |
| | | | 342/385 |
| 2015/0253420 A1* | 9/2015 | Alland | G01S 13/4454 |
| | | | 342/156 |
| 2016/0033632 A1* | 2/2016 | Searcy | G01S 13/4454 |
| | | | 342/153 |
| 2016/0282450 A1* | 9/2016 | Kishigami | G01S 7/282 |
| 2016/0285172 A1* | 9/2016 | Kishigami | G01S 13/284 |
| 2017/0212213 A1* | 7/2017 | Kishigami | G01S 13/04 |
| 2017/0276769 A1* | 9/2017 | Kishigami | G01S 7/282 |
| 2018/0088224 A1* | 3/2018 | Kishigami | G01S 13/34 |
| 2018/0151958 A1* | 5/2018 | Lim | H01Q 17/001 |
| 2019/0293753 A1* | 9/2019 | Iwasa | G01S 7/03 |
| 2019/0324134 A1* | 10/2019 | Cattle | G01S 13/931 |
| 2020/0096626 A1* | 3/2020 | Wang | G01S 13/426 |
| 2020/0217944 A1* | 7/2020 | Giere | G01S 13/44 |
| 2020/0400808 A1* | 12/2020 | Hammes | G01S 7/282 |
| 2021/0055404 A1* | 2/2021 | Schoor | G01S 13/4454 |

* cited by examiner

RADAR SYSTEM AND CONTROL METHOD FOR USE IN A MOVING VEHICLE

INTRODUCTION

The subject disclosure relates to a radar system and a control method for a radar system.

One aspect of a radar system is detecting an angle of arrival of a signal reflected from a detection target. A wide antenna aperture allows for detection of the arrival angle with high resolution. However, populating a wide antenna aperture with a large number of antenna elements results in high cost, high complexity, large space requirements, and high power consumption of the radar system. At the same time, populating a wide antenna aperture with a small number of antenna elements results in a high level of ambiguity in the detected angle of arrival.

Accordingly, it may be desirable to provide a radar system and control method that provides a wide antenna aperture for high resolution and that reduces ambiguity while reducing a total number of antenna elements to minimize complexity, cost, and power consumption.

SUMMARY

In one exemplary embodiment, a radar system for use in a vehicle structured to move in a first direction may include a plurality of antenna elements and a controller operably connected to the plurality of antenna elements. The plurality of antenna elements may pe spaced apart in a second direction different from the first direction. The controller may be configured to record signals received by each antenna element at each time instant of a plurality of time instants. The controller may be further configured to calculate a position in the first direction of each antenna element for each time instant based on a velocity hypothesis. The controller may be further configured to calculate a virtual two-dimensional antenna array response based on the signal received by each antenna element at each time instant and the position in the first direction of each antenna element at each time instant. The controller may be further configured to calculate a beamforming spectrum based on the virtual two-dimensional antenna array response The controller may be further configured to identify a peak in the beamforming spectrum to identify an elevation angle from the vehicle to a target relative to the first direction.

In another exemplary embodiment of the radar system, the controller may be further configured to calculating a velocity score of the beamforming spectrum. The controller may be further configured to iteratively adjust the velocity hypothesis until an optimal velocity hypothesis is determined. The optimal velocity hypothesis may be a velocity hypothesis for which the velocity score of the beamforming spectrum reaches an optimal velocity score, and an optimal beamforming spectrum may be a beamforming spectrum generated using the optimal velocity hypothesis. The controller may be further configured to identify a peak in the optimal beamforming spectrum to identify the elevation angle.

In another exemplary embodiment of the radar system, the velocity score may be given by the equation $S_E = E - \alpha \Sigma_i |s_i|^2$, where $s_i$ is the beamforming spectrum at index i. $\alpha$ may be a normalization factor. N is the number of beamforming angles. E is given by the equation $E = -\Sigma_i \gamma_i \log(\gamma_i)$, where $\gamma_i$ is given by the equation $$\gamma_i = \frac{|s_i|^2}{\Sigma_i |s_i|^2}.$$

In another exemplary embodiment of the radar system, the controller and the plurality of antenna elements are provided in the vehicle. The vehicle may an automated driving system operably connected to the radar system, the automated driving system being structured to autonomously control the vehicle. The controller may be configured to transmit the optimal velocity hypothesis to the automated driving system. The automated driving system may be structured to control operation of the vehicle based on the optimal velocity hypothesis.

In another exemplary embodiment of the radar system, the controller and the plurality of antenna elements may be provided in the vehicle. The vehicle may include an automated driving system operably connected to the radar system, the automated driving system being structured to autonomously control the vehicle. The controller may be configured to transmit the elevation angle to the automated driving system. The automated driving system may be structured to control operation of the vehicle based on the elevation angle.

In another exemplary embodiment of the radar system, a pitch of the antenna elements in the second direction is equal to or larger than 10 times a wavelength of a radar signal transmitted by the radar system.

In another exemplary embodiment of the radar system, the second direction is approximately perpendicular to the first direction.

In another exemplary embodiment of the radar system, the first direction is approximately parallel to a ground surface and the second direction is approximately parallel to a direction of gravity.

In another exemplary embodiment of the radar system, the controller is configured such that the identifying a peak in the beamforming spectrum may include identifying a plurality of peaks in the beamforming spectrum to identify a plurality of elevation angles from the vehicle to a plurality of targets relative to the first direction.

In one exemplary embodiment, a vehicle may include an automated driving system and a radar system operably connected to the automated driving system. The automated driving system may be structured to autonomously control the vehicle to move in a first direction. The radar system may include a plurality of antenna elements spaced apart in a second direction different from the first direction and a controller operably connected to the plurality of antenna elements. The controller may be configured to record signals received by each antenna element at each time instant of a plurality of time instants. The controller may be further configured to calculate a position in the first direction of each antenna element for each time instant based on a velocity hypothesis. The controller may be further configured to calculate a virtual two-dimensional antenna array response based on the signal received by each antenna element at each time instant and the position in the first direction of each antenna element at each time instant. The controller may be further configured to calculate a beamforming spectrum based on the virtual two-dimensional antenna array response. The controller may be further configured to identify a peak in the beamforming spectrum to identify an elevation angle from the vehicle to a target relative to the first direction. The controller may be further configured to transmit the elevation angle of the target to the automated driving system. The automated driving system may be structured to control operation of the vehicle based on the elevation angle.

In another exemplary embodiment of the vehicle, the controller may be further configured to calculate a velocity score of the beamforming spectrum. The controller may be further configured to iteratively adjust the velocity hypothesis until an optimal velocity hypothesis is determined. The optimal velocity hypothesis may be a velocity hypothesis for which the velocity score of the beamforming spectrum reaches an optimal velocity score, and an optimal beamforming spectrum may be a beamforming spectrum generated using the optimal velocity hypothesis. The controller may be further configured to identify a peak in the optimal beamforming spectrum to identify the elevation angle.

In one exemplary embodiment, a control method may be used with a radar system in a vehicle moving in a first direction. The radar system may include a plurality of antenna elements spaced apart in a second direction different from the first direction. The control method may include recording signals received by each antenna element at each time instant of a plurality of time instants. The control method may further include calculating a position in the first direction of each antenna element for each time instant based on a velocity hypothesis. The control method may further include calculating a virtual two-dimensional antenna array response based on the signal received by each antenna element at each time instant and the position in the first direction of each antenna element at each time instant. The control method may further include calculating a beamforming spectrum based on the virtual two-dimensional antenna array response. The control method may further include identifying a peak in the beamforming spectrum to identify an elevation angle from the vehicle to a target relative to the first direction.

In another exemplary embodiment of the control method, the control method may include calculating a velocity score of the beamforming spectrum. The control method may further include iteratively adjusting the velocity hypothesis until an optimal velocity hypothesis is determined. The optimal velocity hypothesis may be a velocity hypothesis for which the velocity score of the beamforming spectrum reaches an optimal velocity score, and an optimal beamforming spectrum may be a beamforming spectrum generated using the optimal velocity hypothesis. The control method may further include identifying a peak in the optimal beamforming spectrum to identify the elevation angle of the target relative to the first direction.

In another exemplary embodiment of the control method, the velocity score is given by the equation: $S_E = E - \alpha \Sigma_i |s_i|^2$, where $s_i$ is the beamforming spectrum at index i. $\alpha$ is a normalization factor. N is the number of beamforming angles, and E is given by the equation $E = -\Sigma_i \gamma_i \log(\gamma_i)$ where $\gamma i$ is given by the equation $$\gamma_i = \frac{|s_i|^2}{\sum_i |s_i|^2}.$$

In another exemplary embodiment of the control method, the vehicle may include an automated driving system operably connected to the radar system. The automated driving system may be structured to autonomously control the vehicle. The control method may further include transmitting the optimal velocity hypothesis to the automated driving system. The automated driving system may be structured to control operation of the vehicle based on the optimal velocity hypothesis.

In another exemplary embodiment of the control method, the vehicle may include an automated driving system operably connected to the radar system. The automated driving system may be structured to autonomously control the vehicle. The control method may further include transmitting the elevation angle to the automated driving system. The automated driving system may be structured to control operation of the vehicle based on the elevation angle.

In another exemplary embodiment of the control method, a pitch of the antenna elements in the second direction may be equal to or larger than 10 times a wavelength of a radar signal transmitted by the radar system.

In another exemplary embodiment of the control method, the second direction may be approximately perpendicular to the first direction.

In another exemplary embodiment of the control method, the first direction may be approximately parallel to a ground surface and the second direction is approximately parallel to a direction of gravity.

In another exemplary embodiment of the control method, the identifying a peak in the beamforming spectrum may include identifying a plurality of peaks in the beamforming spectrum to identify a plurality of elevation angles from the vehicle to a plurality of targets relative to the first direction.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
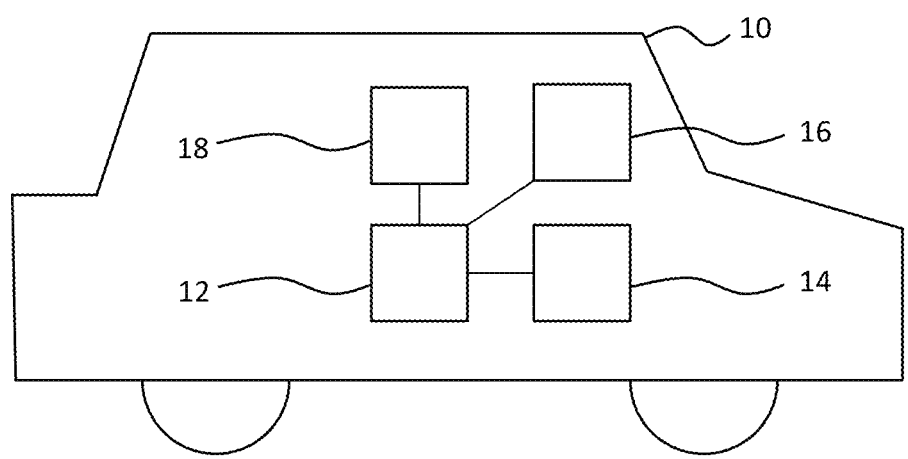
FIG. 1 is a schematic diagram of a vehicle according to an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 illustrates an exemplary embodiment of a vehicle 10 including an automated driving system 12 and radar system 14. Automated driving system 12 may be operably connected to radar system 14, and may also include or be operably connected to additional sensors 16 configured to detect a driving environment. Sensors 16 may include a camera, an additional radar system, a LIDAR system, or any combination of these systems. In response to driving environment information detected by radar system 14 and/or sensors 16, automated driving system 12 may calculate a vehicle path plan for vehicle 10.

Automated driving system 12 may further include or be operably connected to vehicle controllers 18 configured to control speed, acceleration, braking, steering, or other operations necessary for operating vehicle 10. Automated driving system 12 may control vehicle controllers 18 to operate vehicle 10 according to the calculated vehicle path plan. It will be understood that vehicle 10 may be a fully autonomous vehicle in which automated driving system 12 controls all aspects of the vehicle operation, or vehicle 10 may be a vehicle in which the driver retains some control and automated driving system 12, as part of a driver assist system, is configured to assist with a subset of vehicle operations.

Figure 2:
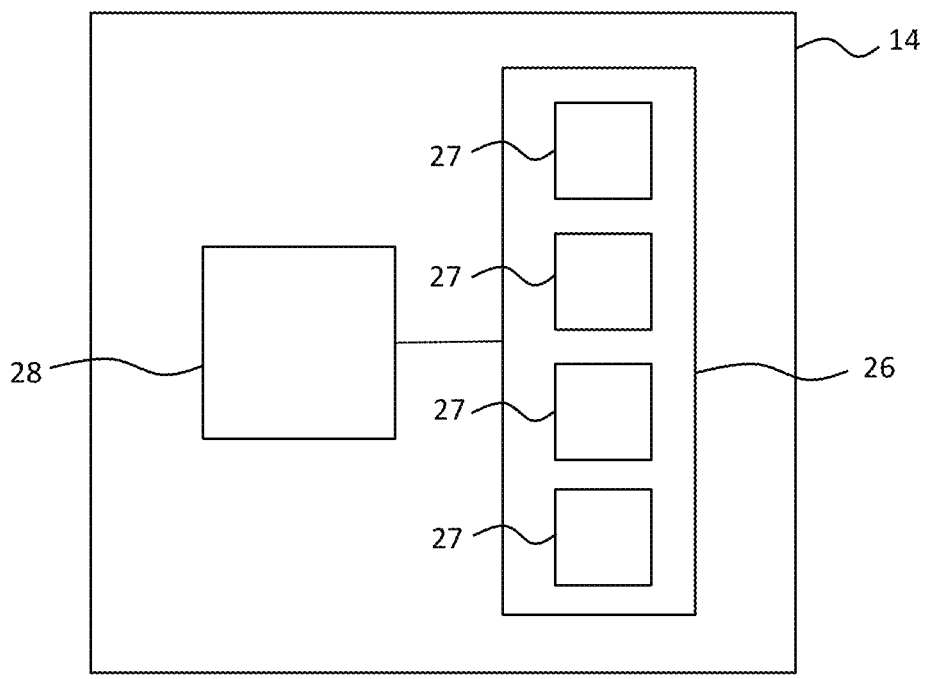
FIG. 2 is a schematic diagram of a radar system according to an exemplary embodiment.

FIG. 2 illustrates an exemplary embodiment of radar system 14 of FIG. 1. Radar system 14 may include an antenna 26 structured to transmit a radar signal and receive reflected radar signals from targets. Antenna 26 may include a plurality of antenna elements 27 and may further include a controller 28 operably connected to antenna 26 and configured to operate on signals received by antenna 26.

Figure 3:
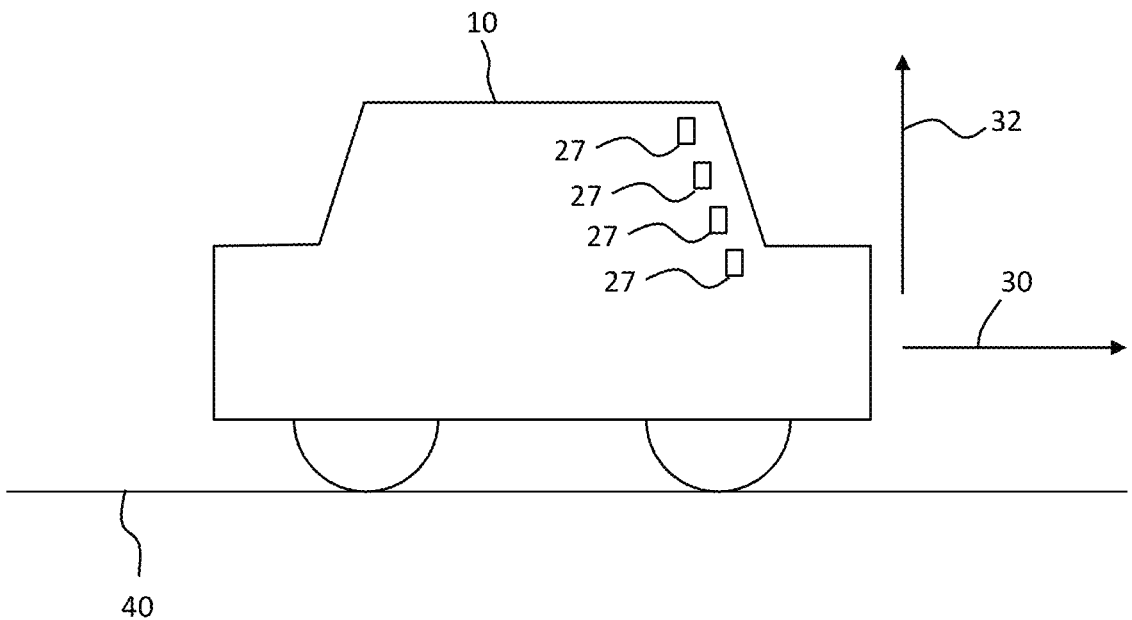
FIG. 3 is a schematic diagram of a vehicle according to an exemplary embodiment.

FIG. 3 illustrates an exemplary embodiment of how antenna elements 27 may be arranged in vehicle 10. For example, if normal vehicle motion is in a first direction 30, antenna elements 27 may be spaced apart in vehicle 10 in a second direction 32. In the embodiment shown in FIG. 3, first direction 30 is approximately parallel to a ground surface 40, and second direction 32 is approximately perpendicular to first direction 30. However, it will be understood that this convention is merely illustrative and that the system and method described herein may be implemented in other orientations as long as antenna elements 27 are spaced apart in a direction different from a direction of motion of vehicle 10.

Figure 4:
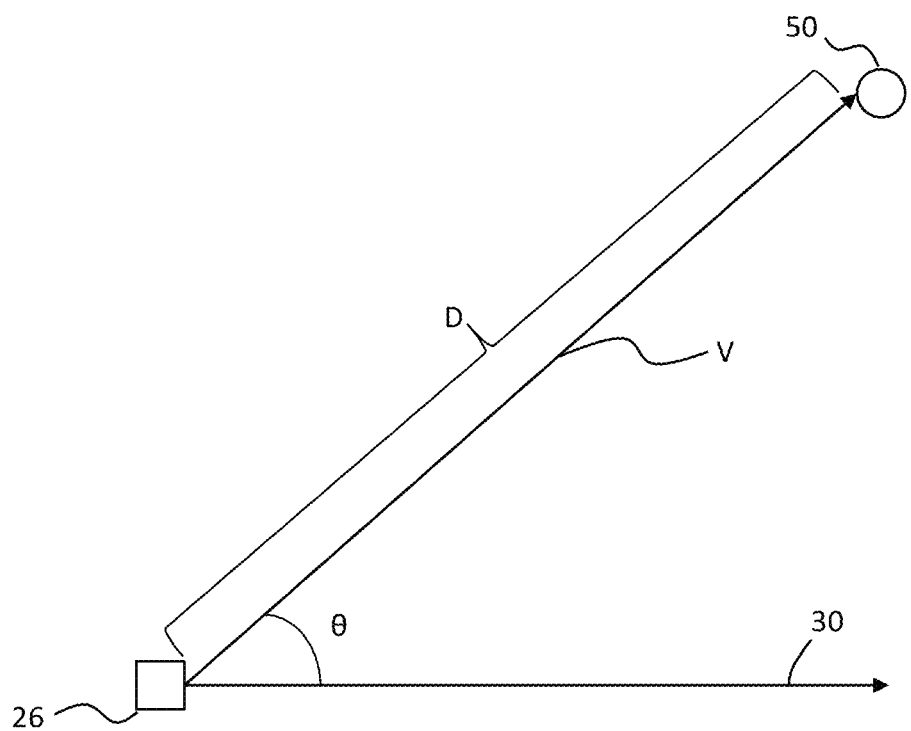
FIG. 4 is a schematic diagram showing an antenna and a detection target according to an exemplary embodiment.

FIG. 4 illustrates an exemplary embodiment of a relationship between antenna 26 and detection target 50. The relationship between antenna 26 and detection target 50 may be characterized by a vector V defined by a distance D between antenna 26 and detection target 50 and elevation angle θ from antenna 26 to detection target 50 relative to first direction 30.

Figure 5:
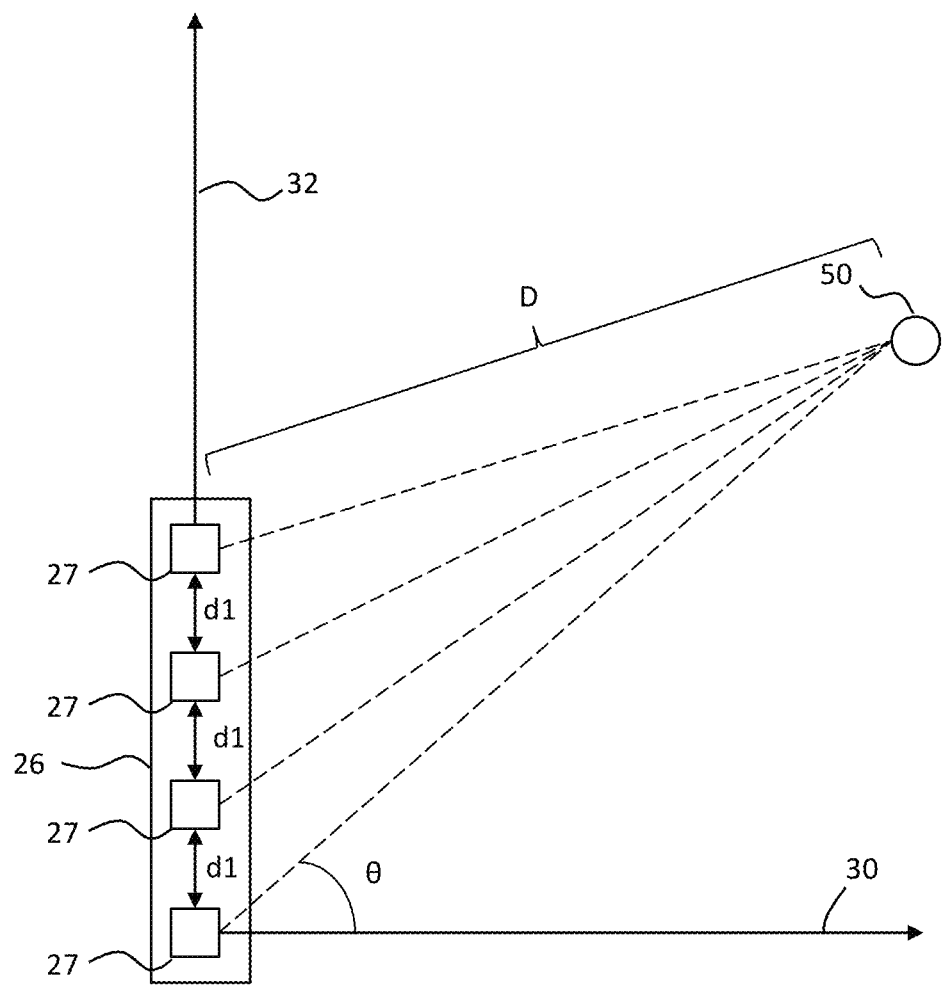
FIG. 5 is a schematic diagram showing antenna elements and a detection target according to an exemplary embodiment.

FIG. 5 is similar to FIG. 4 and illustrates an exemplary embodiment of antenna 26 represented by discrete antenna elements 27. As seen in FIG. 5, antenna elements 27 may be spaced apart in second direction 32 at a pitch d1. While FIG. 5 illustrates an equal pitch d1 between all antenna elements 27, it will be understood an exemplary embodiment may include antenna elements 27 that are unevenly spaced in the second direction. It will be understood that for large distances to target D, the elevation angle from each antenna element 27 to detection target 50 will be substantially the same.

It will be understood than an angular resolution of radar system 14 will increase as an aperture of antenna 26 increases (i.e., as a width of antenna 26 facing detection target 50 increases). This can be achieved by spacing antenna elements 27 along second direction 32. However, while increased antenna aperture may increase resolution, there may be ambiguity (i.e., false detections, at angles close to the true elevation angle θ). In the embodiment of FIG. 5, in which antenna elements 27 are spaced apart in second direction 32, the phase offset between antenna elements may be given by the following equation:

$$\phi_{offset} = \frac{2\pi(d1)}{\lambda}\sin\theta; \qquad (1)$$

where γ is the wavelength of the radar signal output by radar system 14 (see FIG. 2). Due to this phase offset, there may be ambiguities in the detected elevation angle of detection target 50, as indicated by the following equation:

$$\phi_{amb} < \sin^{-1}\frac{1}{N}; \qquad (2)$$
$$\text{where } d1 = N\frac{\lambda}{2}.$$

N is a coefficient used to express the pitch d1 between antenna elements 27 in terms of wavelength γ. $\phi_{amb}$ is the maximal unambiguous angle, which means that any θ that is larger than $\phi_{amb}$ will be ambiguous. In a Bartlett beamforming spectrum, any θ that is larger than $\phi_{amb}$ will have multiple possible hypothesis angles with equal likelihood. Based on equation (2), it will be understood that as N increases, the maximal ambiguous angle for an array spaced in the second direction will approach 0 degrees, meaning that there will be a large number of possible hypothesis angles with equal likelihood.

Based on these equations (1) and (2), it will be understood that an antenna 26 with a large pitch (i.e., a high N) between antenna elements will have a high ambiguity, and an antenna 26 with a low pitch, (i.e., N=1) will have a low ambiguity. However, at typical wavelengths for a radar system (such as 4 mm), a system with a small pitch between antenna elements 27 will require so many antenna elements 27 to achieve the desired antenna aperture and resolution that the system will become cost prohibitive and resource prohibitive. In contrast, a radar system in which the spacing between antenna elements 27 is increased will increase antenna aperture and resolution, but at the cost of increased ambiguity. In an exemplary embodiment, a desired angular resolution may be achieved with antenna elements 27 having a pitch d1 that is greater than or equal to 10 times the wavelength of the radar signal, but the resulting high ambiguity would be unsuitable for practical purposes.

Figure 6:
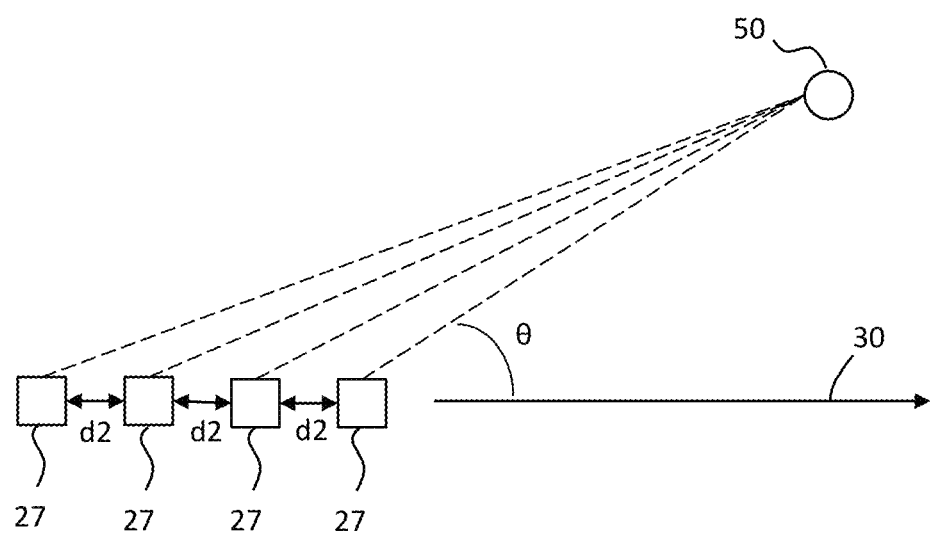
FIG. 6 is a schematic diagram showing antenna elements and a detection target according to an exemplary embodiment.

In order to overcome the ambiguity presented by widely spaced antenna elements arranged as in FIG. 5, antenna elements 27 may be arranged spaced at a pitch d2 in the moving direction (i.e., first direction 30) as seen in FIG. 6. In the arrangement of FIG. 6, in which antenna elements 27 are spaced apart in first direction 30, the phase offset between antenna elements may be given by the following equation:

$$\phi_{offset} = \frac{2\pi(d2)}{\lambda}\cos\theta; \quad (3)$$

where $\lambda$ is the wavelength of the radar signal output by radar system 14 (see FIG. 2). Due to this phase offset, there may be ambiguities in the detected elevation angle of detection target 50, as indicated by the following equation:

$$\phi_{amb} < \cos^{-1}\frac{1}{N}; \quad (4)$$

$$\text{where } d2 = N\frac{\lambda}{2}.$$

As described in detail herein, $\phi_{amb}$ is the maximal unambiguous angle. Based on equation (4), it will be understood that as N increases, the maximal ambiguous angle for an array spaced in the first direction will approach 90 degrees; meaning that ambiguity will be low.

As seen from equations (3) and (4), it will be understood that antenna elements 27 with a large pitch in the first direction 30 (i.e., a high N), will have a low angular resolution and a low ambiguity, which is the opposite of the response of the arrangement shown in FIG. 5.

Figure 7A:
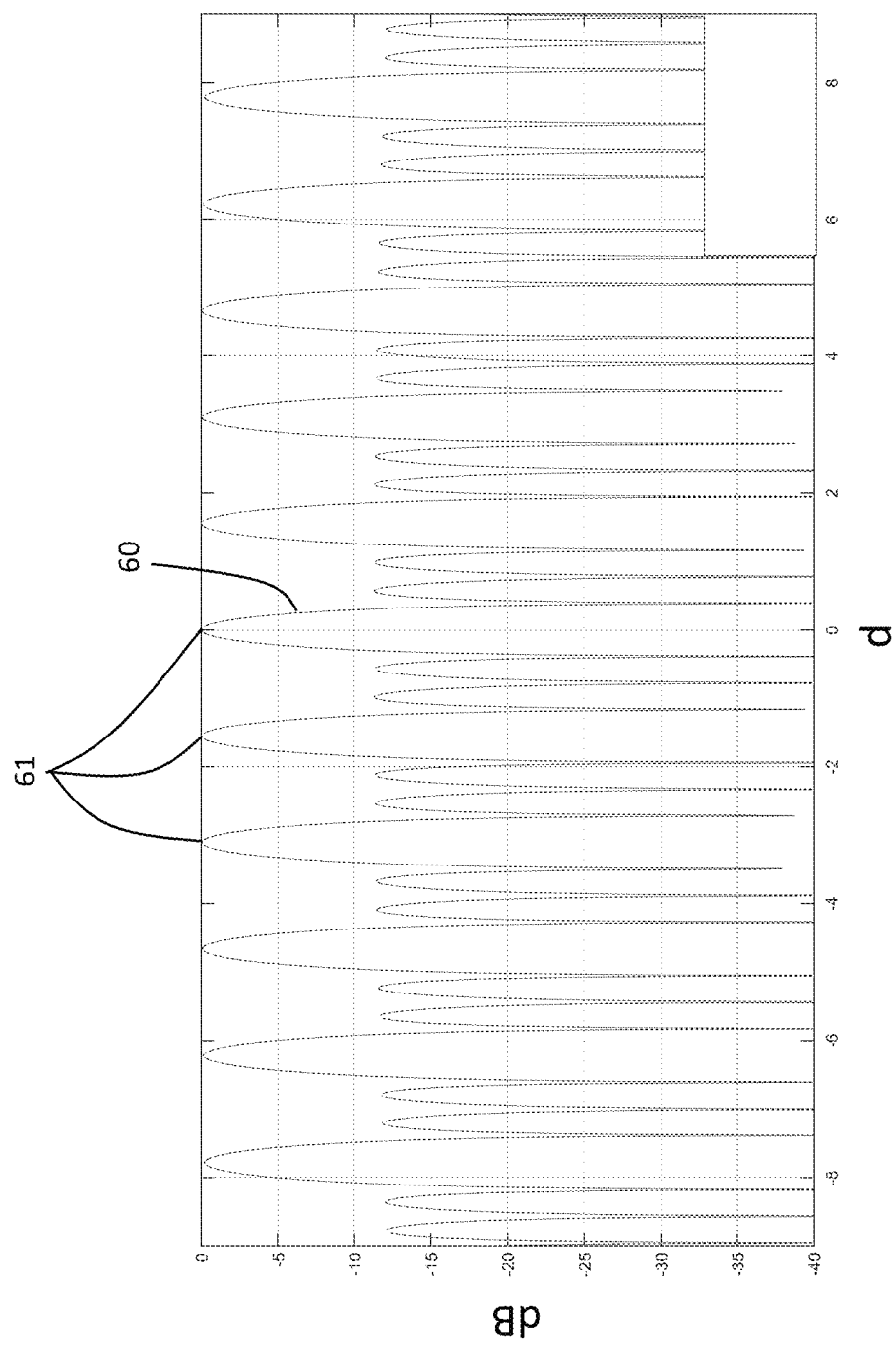
FIG. 7A is a graph showing beamforming spectra according to an exemplary embodiment.
Figure 7B:
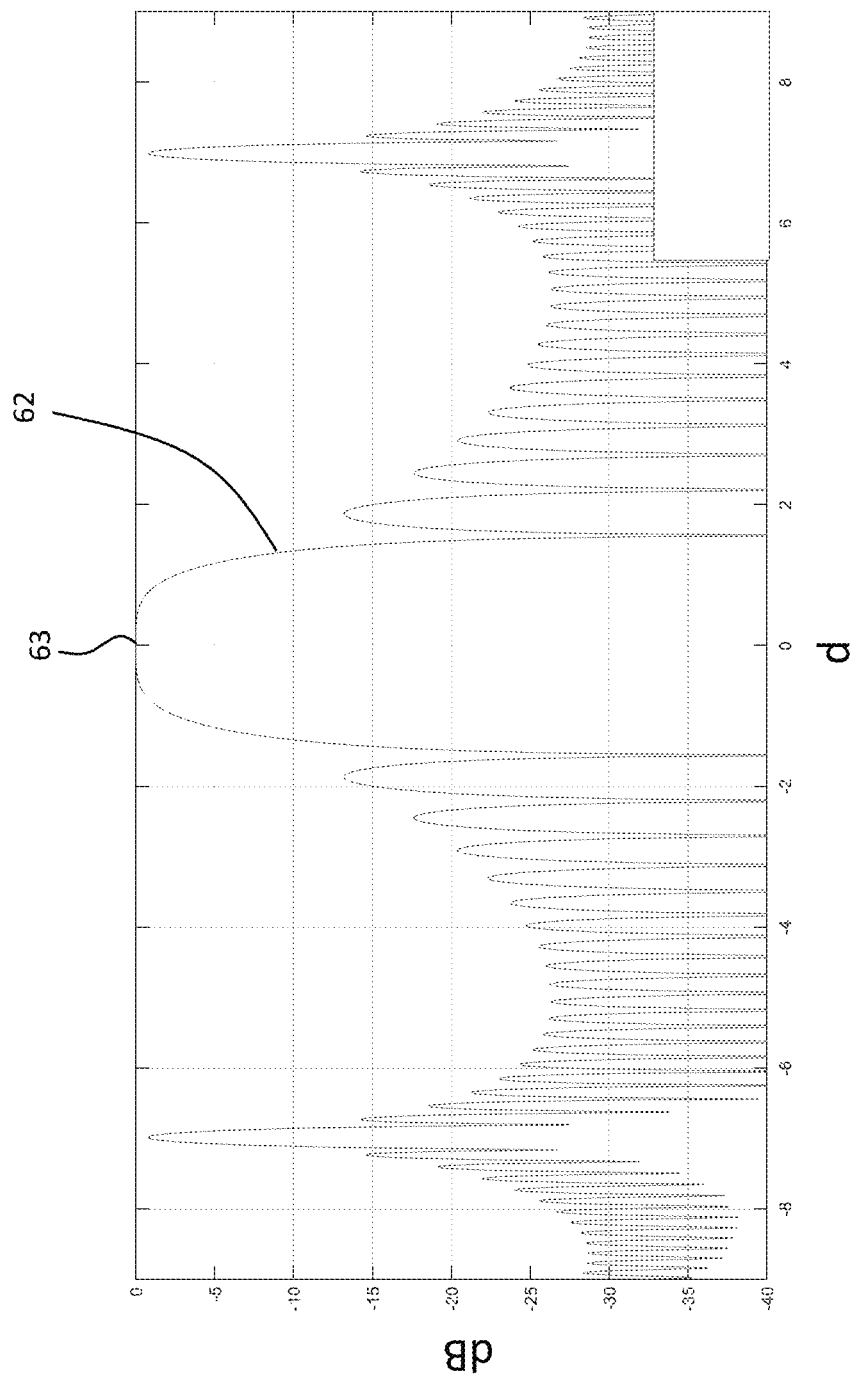
FIG. 7B is a graph showing beamforming spectra according to an exemplary embodiment.

FIGS. 7A and 7B illustrate a graphical representation of the different Bartlett beamforming response of antenna arrays based on the vertical array arrangement of FIG. 5 and the horizontal array arrangement of FIG. 6. For example, FIG. 7A includes curve 60, which represents a Bartlett beamforming spectrum based on the response of antenna elements 27 spaced apart in second direction 32 as shown in FIG. 5. As seen in FIG. 7A, curve 60 has a high angular resolution (indicated by the narrow width of the peaks 61 of curve 60) but also a high ambiguity (indicated by the high number of closely spaced peaks with similar amplitude). In contrast, FIG. 7B includes curve 62, which represents a Bartlett beamforming spectrum based on the response of antenna elements 27 spaced apart in first direction 32 as shown in FIG. 6. As seen in FIG. 7B, curve 62 has a low resolution (indicated by the wide width of the peak 63 of curve 62 centered at 0 degrees) and a low ambiguity (indicated by the lack of similar peaks to the main peak of curve 62).

Figure 7C:
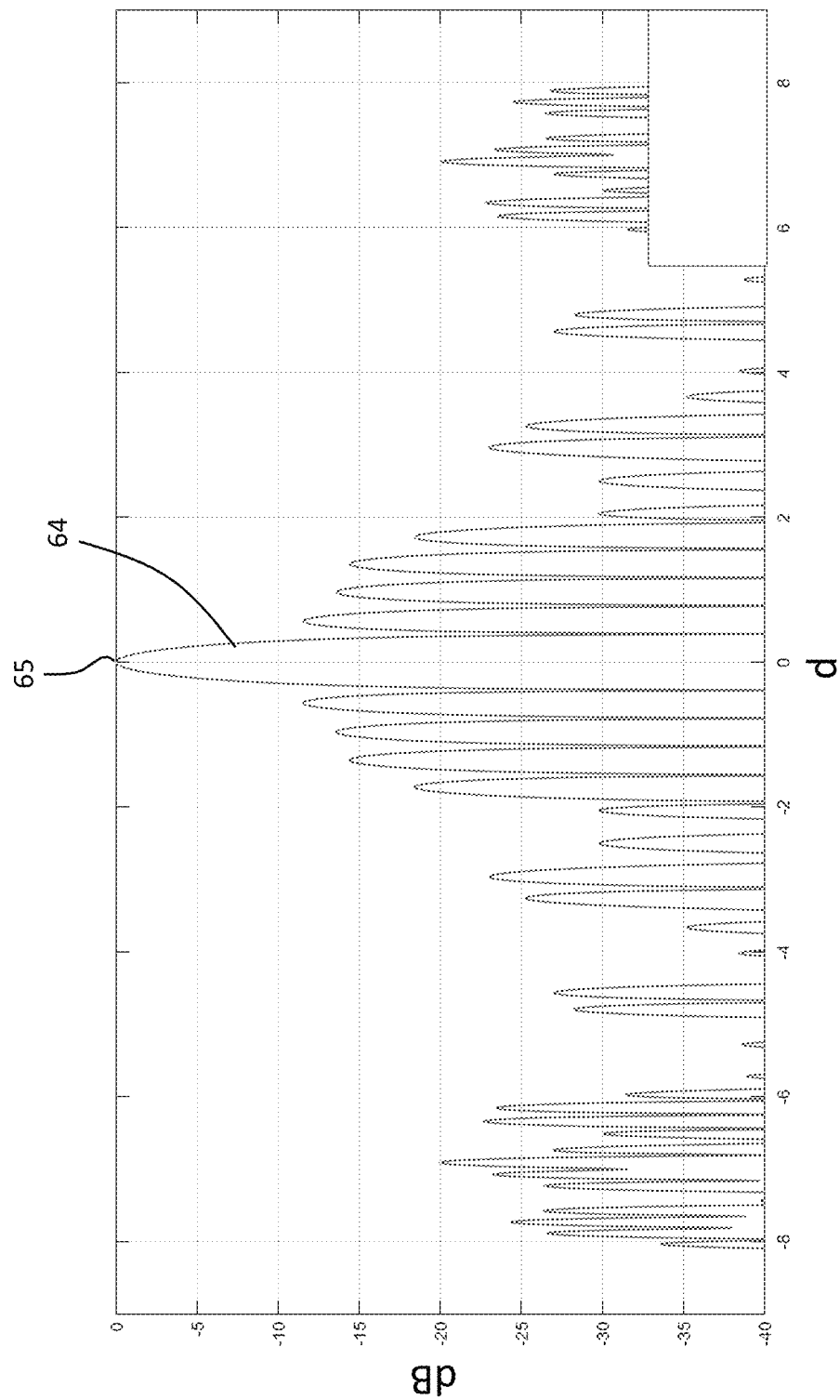
FIG. 7C is a graph showing beamforming spectra according to an exemplary embodiment.
Figure 8:
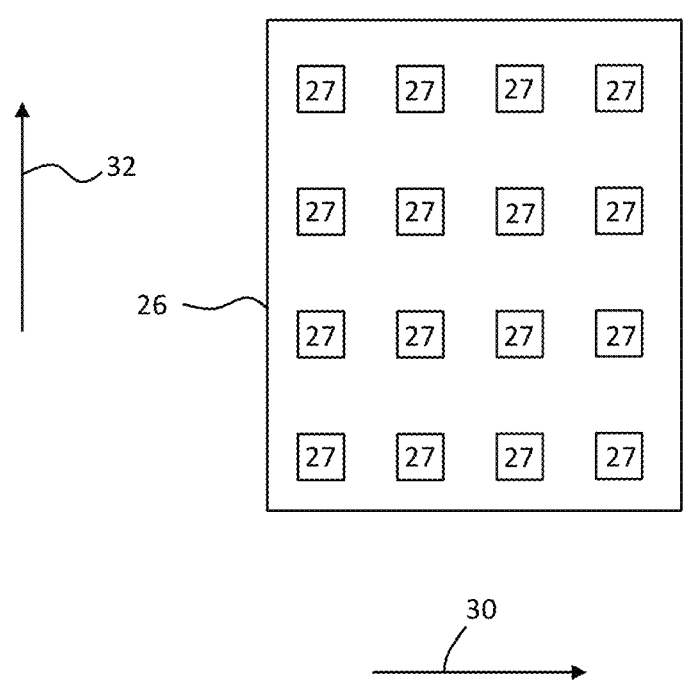
FIG. 8 is a schematic diagram of a two-dimensional array of antenna elements according to an exemplary embodiment.

FIG. 8 illustrates an exemplary embodiment of an antenna 26 in which antenna elements 27 are spaced apart in both first direction 30 and second direction 32. By arranging antenna elements 27 in both the first direction 30 and the second direction 32, the resulting beamforming spectrum can achieve both high resolution and low ambiguity. For example, FIG. 7C includes curve 64, which represents a Bartlett beamforming spectrum based on the response of antenna elements 27 arranged as shown in FIG. 8. As seen in FIG. 7C, curve 64 has a high angular resolution (indicated by the narrow width of the primary peak 65 of curve 64) and a low ambiguity (indicated by the existence of only one peak 65 of curve 64 at the highest amplitude).

However, it will be understood that providing an antenna 26 with antenna elements 27 spaced in both first direction 30 and second direction 32, as shown in FIG. 8, increases the total number of required antenna elements 27, which would increase the cost and resource consumption of the radar system. Additionally, it may not be physically feasible to provide a large two-dimensional array of antenna elements 27 due to space limitations in a vehicle. Accordingly, the motion of vehicle 10 can be used to generate a virtual two-dimensional array of antenna elements 27.

For example, as seen in FIG. 3, vehicle 10 may move in first direction 30. As vehicle 10 is moving, controller 28 (see FIG. 2) may record the responses of antenna elements 27 at a plurality of time instants $t_1, t_2, t_3, \ldots t_T$ to generate a virtual two-dimensional antenna array.

Figure 9:
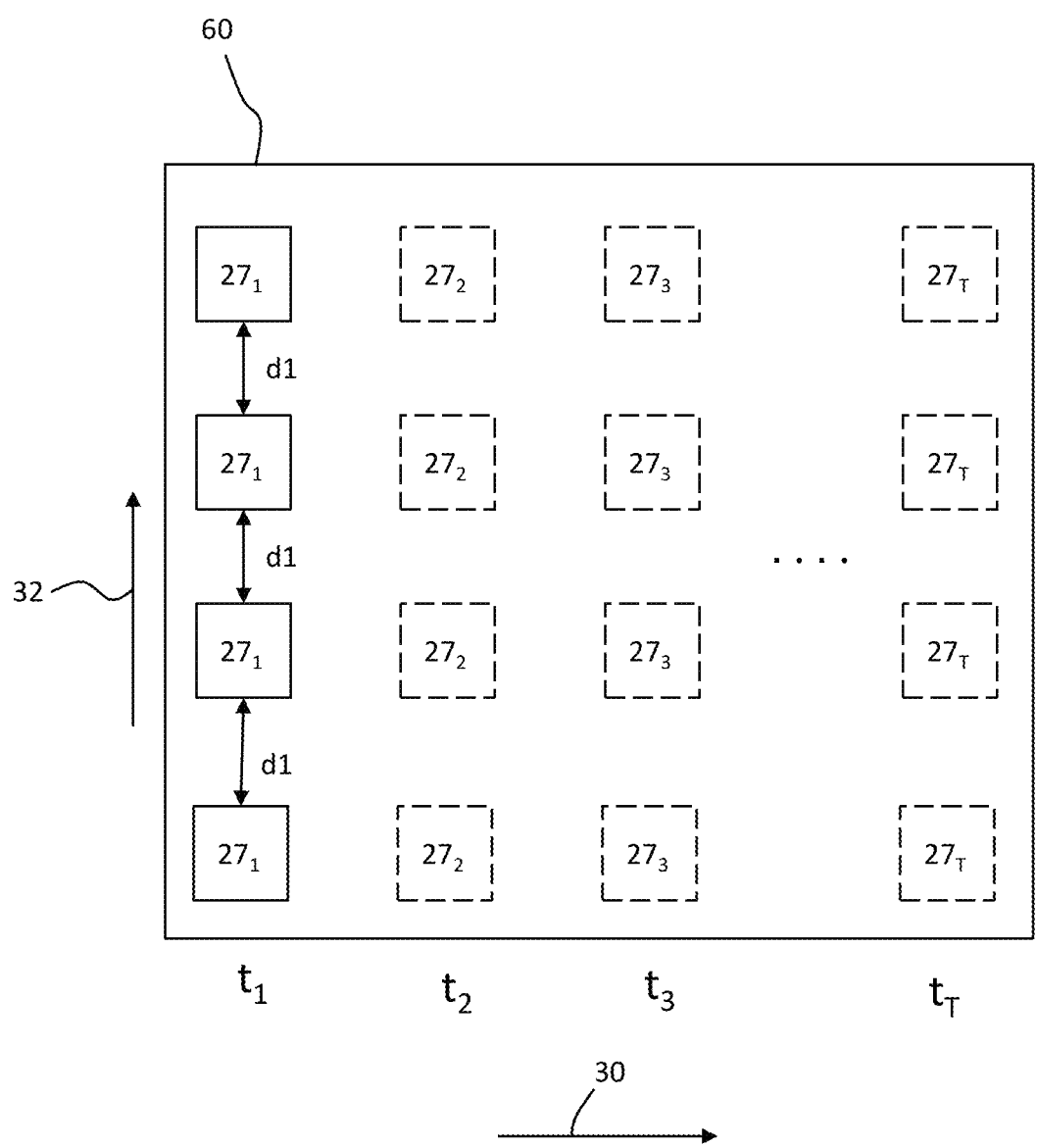
FIG. 9 is a schematic diagram showing a virtual two-dimensional array of antenna elements according to an exemplary embodiment.

FIG. 9 illustrates an exemplary embodiment of a virtual two-dimensional antenna array 60. Antenna elements $27_1, 27_2, 27_3, \ldots 27_T$ correspond to positions of antenna elements 27 at time instants $t_1, t_2, t_3, \ldots t_T$. Pitch d1 between antenna elements 27 in the second direction 32 is known from when antenna elements 27 are installed in vehicle 10. Relative positions of antenna elements $27_1, 27_2, 27_3, \ldots 27_T$ in first direction 30 can be calculated based on a velocity of vehicle 10 in the first direction 30 and a predetermined time difference $\Delta t$ between time instants $t_1, t_2, t_3, \ldots t_T$. The velocity of vehicle 10 may be initially determined by velocity hypothesis calculated from instrumentation of vehicle 10 such as a speed sensor, GPS, or other suitable instruments, or may be based on a previously calculated velocity hypothesis of vehicle 10.

The responses of antenna elements 27 at time instants $t_1, t_2, t_3, \ldots t_T$ can be used in conjunction with the calculated positions of antenna elements 27 to calculate a virtual two-dimensional antenna array response of virtual two-dimensional antenna array 60. Bartlett beamforming can then be performed on the virtual two-dimensional antenna array response to generate a beamforming spectrum such as curve 64 in FIG. 7C. The elevation angle of detection target 50 can be determined from the beamforming spectrum.

The accuracy of the velocity hypothesis can affect calculation of the positions of antenna elements $27_1, 27_2, 27_3, \ldots 27_T$ within the virtual two-dimensional antenna 60 of FIG. 9, and consequently, affect subsequent beamforming based on virtual two-dimensional antenna 60. To determine the optimal velocity hypothesis, the initial velocity hypothesis may be iteratively adjusted, as described in detail herein.

For example, controller 28 (see FIG. 2) may be configured to calculate a velocity score for the beamforming spectrum calculated from the virtual two-dimensional antenna array response. The velocity score may be given by the following equation:

$$S_E = E - \alpha \Sigma_i |s_i|^2; \quad (5)$$

where $s_i$ is the beamforming spectrum at index i. $\alpha$ is a normalization factor that can be given by the equation:

$$\alpha = \frac{0.25 \log(N)}{\max_i(s_i)}; \quad (6)$$

where N is the number of beamforming angles (i.e., the beamforming grid points) and $\max_i(\ )$ is a function returning the maximum for all i, E is given by the equation:

$$E = -\Sigma_i \gamma_i \log(\gamma_i) \quad (7)$$

$\gamma_i$ is given by the equation:

$$\gamma_i = \frac{|s_i|^2}{\sum_i |s_i|^2}. \quad (8)$$

Controller 28 may be further configured to determine whether an optimal velocity score has been identified. In an exemplary embodiment, the optimal velocity score is a minimum velocity score. However, it will be understood that other types of optimal velocity scores, such as a maximum velocity score, may be used depending on the exact equations and axis polarities used to calculate the velocity score. Controller 28 may determine a minimum velocity score by using a coarse grid search over a large span of velocity hypotheses, and then a refined grid search in the vicinity of the most likely candidates. Alternatively, the adjustment may be made by an iterative gradient descent (i.e., starting from an initial guess, and each time through choose the next velocity step in a direction that recues the velocity score).

Figure 10:
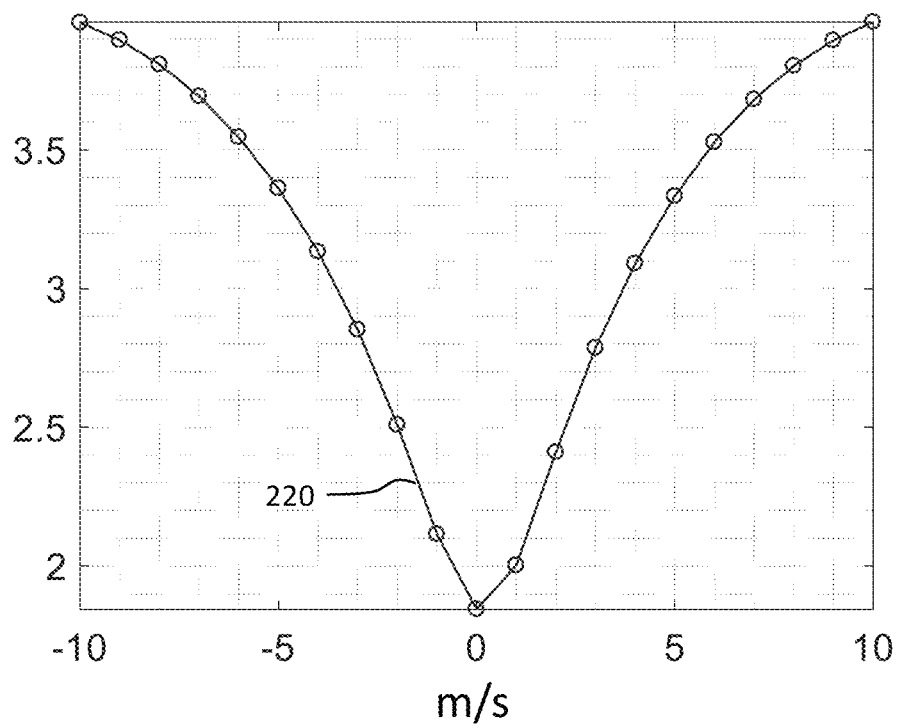
FIG. 10 is a graph showing a relationship between velocity score and velocity hypothesis according to an exemplary embodiment.

FIG. 10 illustrates an exemplary embodiment of an optimization process of the velocity hypothesis. Curve 220 illustrates a relationship between velocity score and velocity hypothesis in a hypothetical calculation. Each of the points on curve 220 represents a velocity hypothesis for which the velocity score was calculated. The velocity hypothesis at the minimum of curve 220 is the optimal velocity hypothesis.

Once the velocity hypothesis is adjusted, controller 28 may calculate new positions of antenna elements $27_1$, $27_2$, $27_3$, ... $27_T$ of virtual two-dimensional antenna array 60 (see FIG. 9), and then calculate a new beamforming spectrum based on the revised virtual two-dimensional antenna array 60.

Once controller 28 identifies a minimum velocity score, the velocity hypothesis associated with the minimum velocity score is output as the optimal velocity hypothesis, and the beamforming spectrum associated with the optimal velocity hypothesis is identified as the optimal beamforming spectrum. Controller 28 may output a peak of the optimal beamforming spectrum as an elevation angle of detection target 50. Controller 28 may output the optimal velocity hypothesis and the elevation angle of detection target 50 to automated driving system 12 (see FIG. 1), and automated driving system 12 may control vehicle 10 based on the optimal velocity hypothesis the elevation angle of detection target 50. The optimal velocity hypothesis may also be used as an initial velocity hypothesis for subsequent detections.

Figure 11:
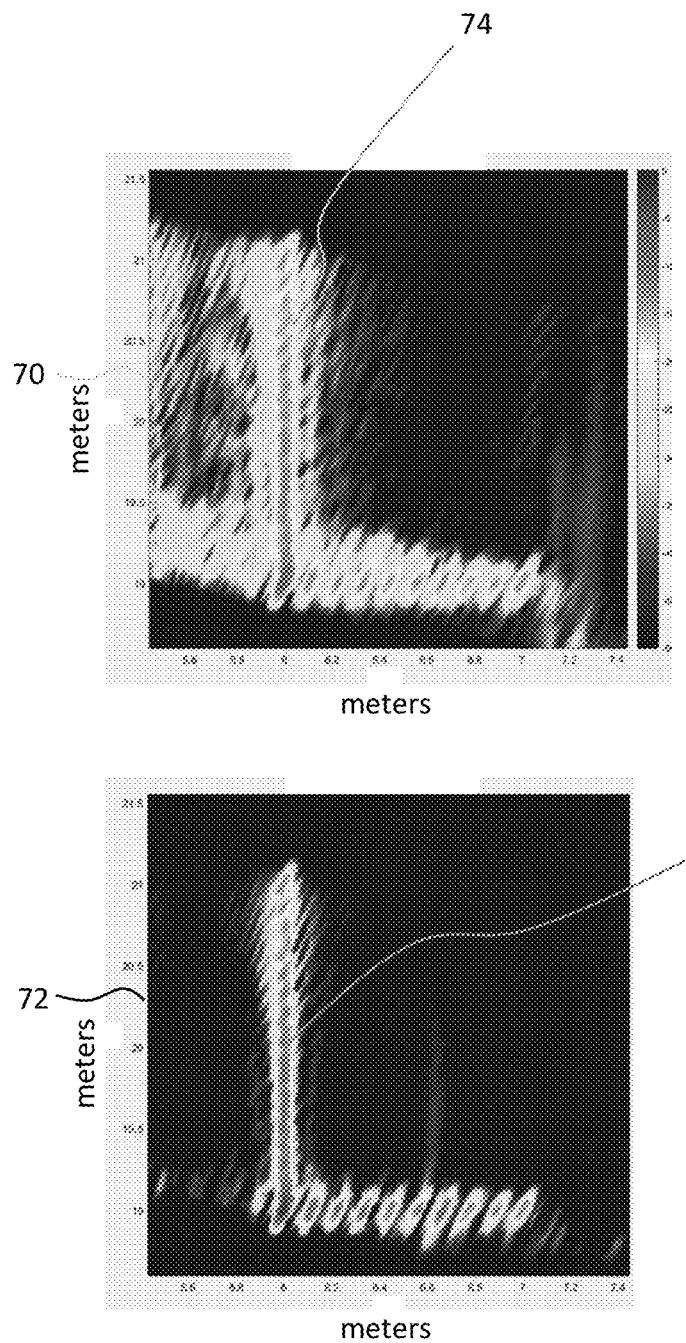
FIG. 11 is a comparison of beamforming images during velocity hypothesis correction according to an exemplary embodiment.
Figure 12:
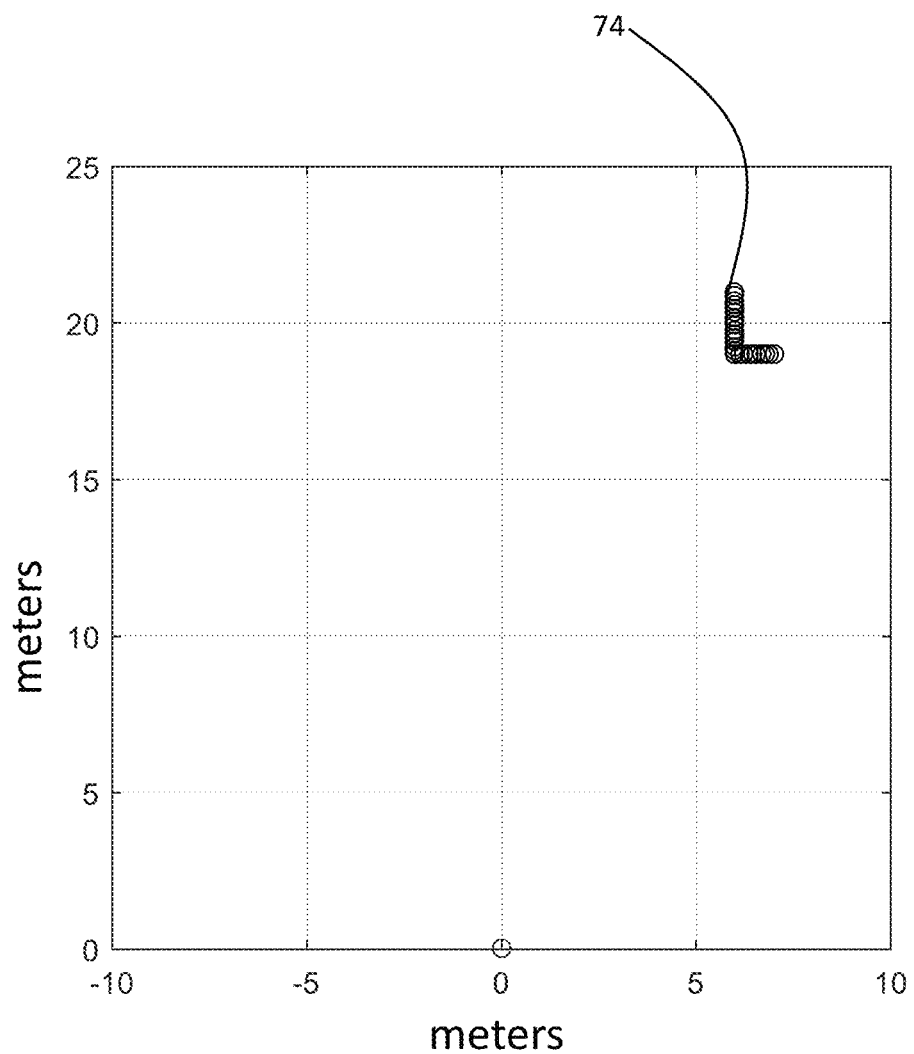
FIG. 12 is a graph showing a test scenario according to an exemplary embodiment.
Figure 13:
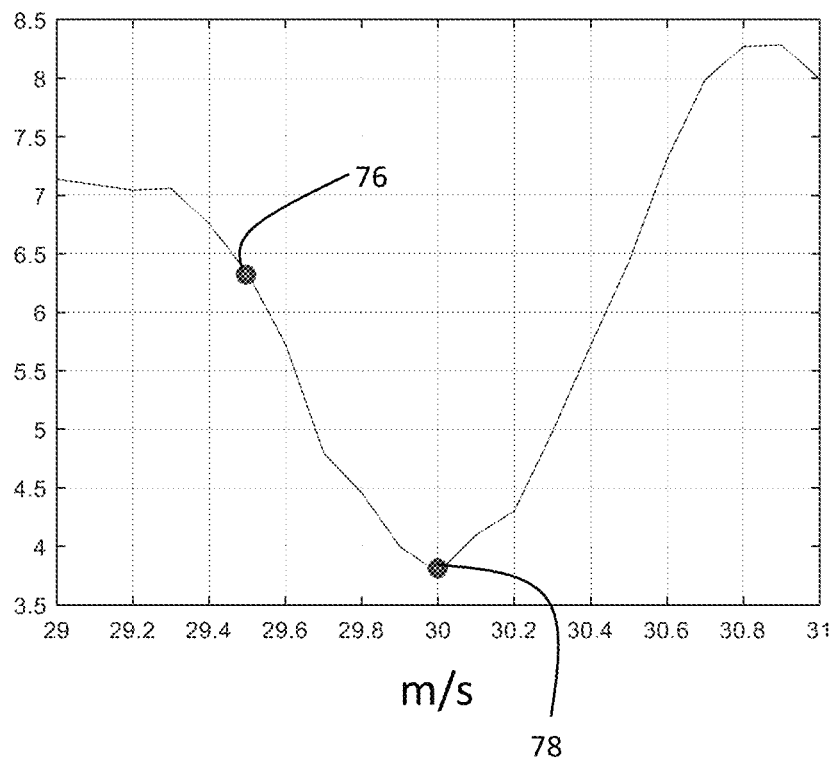
FIG. 13 is a graph showing a relationship between velocity score and velocity hypothesis in a test scenario according to an exemplary embodiment.

FIG. 11 illustrates experimental data comparing a beamforming image 70 generated with a velocity error and an optimal beamforming image 72 generated with an accurate velocity. FIG. 12 illustrates the test scenario used to generated images 70, 72 shown in FIG. 11. As seen in FIG. 12, the detection target 74 includes a collection of discrete elements arranged in an L-shape, and a relative velocity of 30 m/s between detection target and the radar was used. FIG. 13 illustrates a curve of the velocity score as a function of velocity hypothesis for the test scenario, with point 76 illustrating the velocity hypothesis of 29.5 m/s used to generate beamforming image 70 (see FIG. 11) and point 78 illustrating the velocity hypothesis of 30 m/s used to generate beamforming image 72. Based on FIGS. 11-13, it can be seen that optimal beamforming image 72 resolved detection target 74 more clearly when an accurate velocity hypothesis was used.

Figure 14:
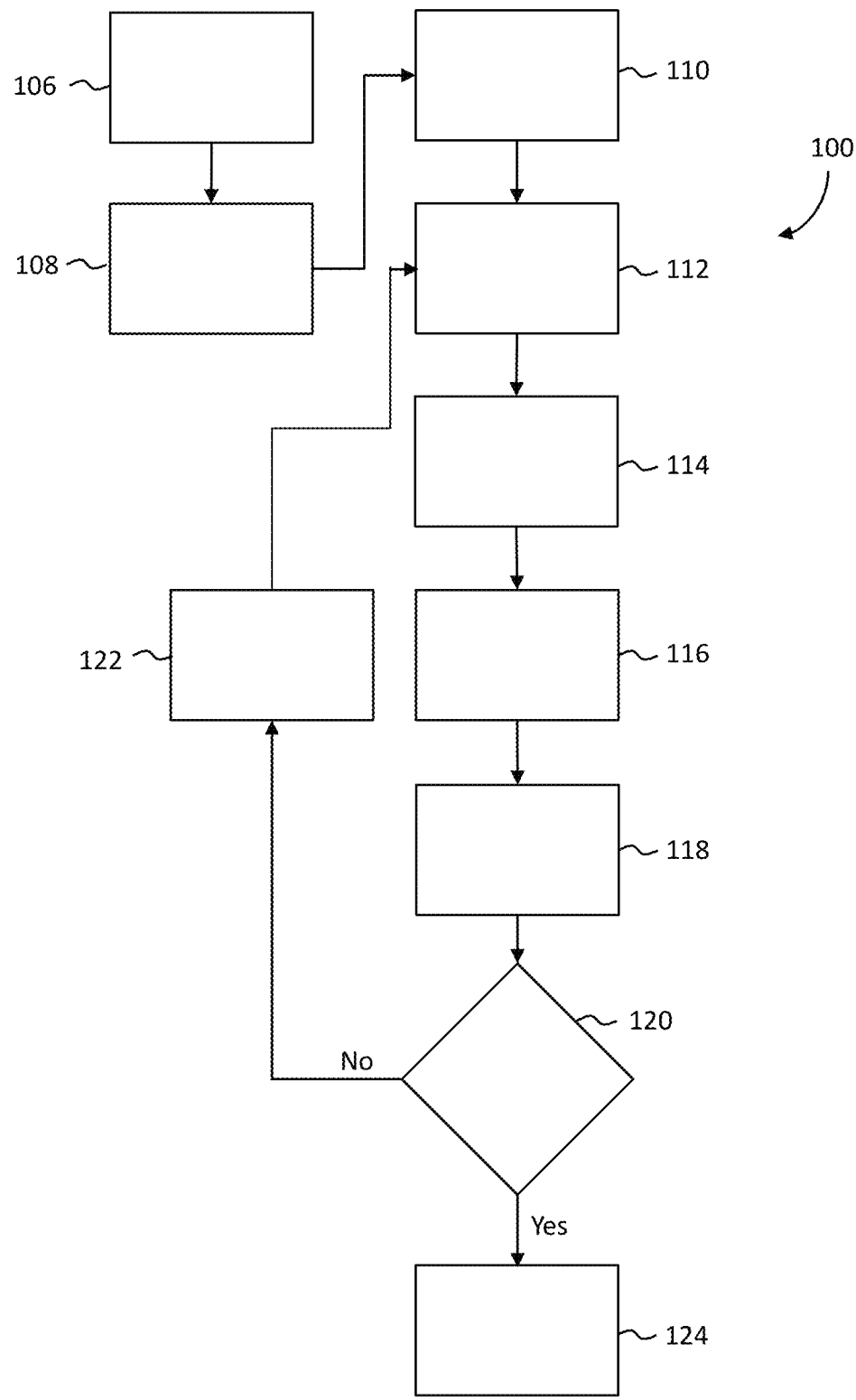
FIG. 14 is a flowchart illustrating an exemplary embodiment of a control method for a radar system.

FIG. 14 illustrates an exemplary embodiment of a control method 100 for use with a radar system 14 in a vehicle 10 structured to move in a first direction 30 (see FIG. 1 and FIG. 3). In block 106, vehicle 10 is provided that includes radar system 14 having a controller 28 and an antenna 26 comprising a plurality of antenna elements 27 spaced apart in second direction 32. In block 108, vehicle 10 is moved in first direction 30.

In block 110, controller 28 records a response of antenna elements 27 at each of a plurality of time instants $t_1$, $t_2$, $t_3$, ... $t_T$ (see FIGS. 2 and 9). In block 114, controller 28 calculates positions of antenna elements 27 at each of the plurality of time instants based on an initial velocity hypothesis to generate a virtual two-dimensional antenna array 60 (see FIG. 9). In block 114, controller 28 calculates a virtual two-dimensional antenna array response by combining the response of antenna elements 27 at each of the time instants with the positions of antenna elements 27 at each of the time instants. In block 116, controller 28 performs Bartlett beamforming on the virtual two-dimensional antenna array response to generate a beamforming spectrum.

In block 118, a velocity score $S_E$ is calculated for the beamforming spectrum calculated in block 116, as described in detail herein. In block 120, it is determined whether a minimum velocity score has been identified. If a minimum velocity score has been identified ("Yes" in block 120), then the method proceeds to block 124. If no minimum velocity score has been identified ("No" in block 120), then the method proceeds to block 122. In block 122, the initial velocity hypothesis is adjusted as described in detail herein. Once the velocity hypothesis is adjusted in block 122, the method returns to block 112, where new positions of antenna elements 27 are calculated based on the adjusted velocity hypothesis. Once a minimum velocity score is identified in block 120, a peak of the beamforming spectrum associated with the minimum velocity score is identified in block 124. Alternatively, if multiple detection objects are at a similar range but different angles of arrival, multiple peaks may be detected in block 124.

Figure 15:
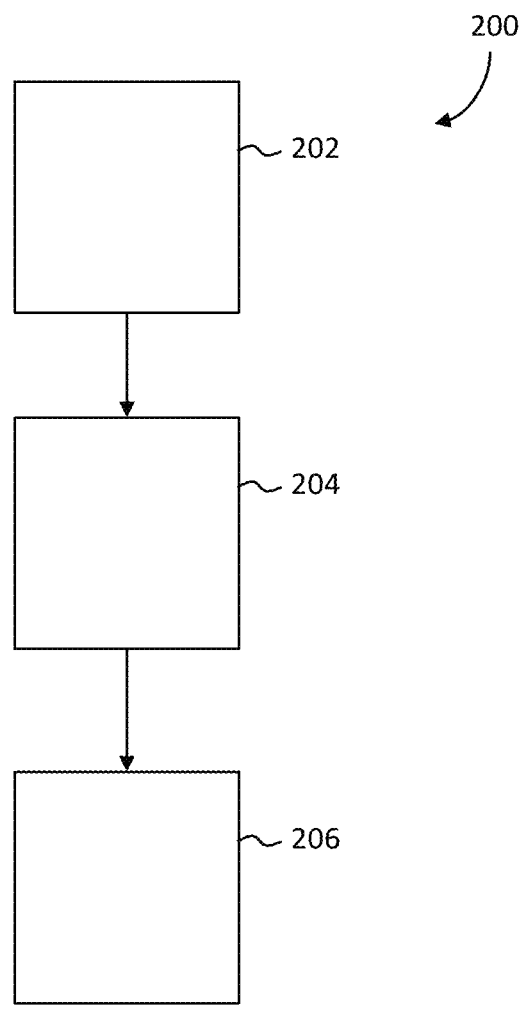
FIG. 15 is a flowchart illustrating an exemplary embodiment of a control method of a vehicle.

FIG. 15 illustrates an exemplary embodiment of how the control method 100 shown in FIG. 14 may be used in the context of operating vehicle 10. For example, in block 202, an optimal velocity hypothesis for vehicle 10 and elevation angle of detection target 50 (see FIG. 3) are calculated as discussed in detail herein. In block 204, controller 28 of radar system 14 transmits the optimal velocity hypothesis and elevation angle to automated driving system 12 (see FIGS. 1-2). In block 206, automated driving system 12 adjusts control of vehicle 10 based on the optimal vehicle hypothesis and the elevation angle of detection target 50.

The exemplary embodiments described above result in significant advantages over conventional systems and methods. For example, the exemplary embodiments make it possible to achieve the combined high resolution and low ambiguity of a two-dimensional antenna array by using a single array of antenna elements combined with velocity information of the vehicle, thereby reducing cost, complexity, and power requirements of the radar system.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system for use in a vehicle structured to move in a first direction, the radar system comprising:
   a plurality of antenna elements spaced apart in a second direction different from the first direction; and
   a controller operably connected to the plurality of antenna elements;
   wherein the controller is configured to perform:
      recording signals received by each antenna element at each time instant of a plurality of time instants;
      calculating a position in the first direction of each antenna element for each time instant based on a velocity hypothesis;
      calculating a virtual two-dimensional antenna array response based on the signal received by each antenna element at each time instant and the position in the first direction of each antenna element at each received time instant;
      calculating a beamforming spectrum based on the virtual two-dimensional antenna array response; and
      identifying a peak in the beamforming spectrum to identify an elevation angle from the vehicle to a target relative to the first direction.

2. The radar system of claim 1, wherein the controller is further configured such that the identifying a peak in the beamforming spectrum comprises:
   calculating a velocity score of the beamforming spectrum;
   iteratively adjusting the velocity hypothesis until an optimal velocity hypothesis is determined, the optimal velocity hypothesis being a velocity hypothesis for which the velocity score of the beamforming spectrum reaches an optimal velocity score, and an optimal beamforming spectrum being a beamforming spectrum generated using the optimal velocity hypothesis; and
   identifying a peak in the optimal beamforming spectrum to identify the elevation angle.

3. The radar system of claim 2, wherein the velocity score is given by the equation:

$$S_E = E - \alpha \sum_i |s_i|^2$$

wherein $s_i$ is the beamforming spectrum at index i, $\alpha$ is a normalization factor, and E is given by the equation:

$$E = -\sum_i \gamma_i \log(\gamma_i)$$

wherein $\gamma_i$ is given by the equation:

$$\gamma_i = \frac{|s_i|^2}{\sum_i |s_i|^2}.$$

4. The radar system of claim 2, wherein:
   the controller and the plurality of antenna elements are provided in the vehicle;
   the vehicle comprises an automated driving system operably connected to the radar system, the automated driving system being structured to autonomously control the vehicle;
   the controller is configured to transmit the optimal velocity hypothesis to the automated driving system; and
   the automated driving system is structured to control operation of the vehicle based on the optimal velocity hypothesis.

5. The radar system of claim 2, wherein:
   the controller and the plurality of antenna elements are provided in the vehicle;
   the vehicle comprises an automated driving system operably connected to the radar system, the automated driving system being structured to autonomously control the vehicle;
   the controller is configured to transmit the elevation angle to the automated driving system; and
   the automated driving system is structured to control operation of the vehicle based on the elevation angle.

6. The radar system of claim 1, wherein a pitch of the antenna elements in the second direction is equal to or larger than 10 times a wavelength of a radar signal transmitted by the radar system.

7. The radar system of claim 1, wherein the second direction is approximately perpendicular to the first direction.

8. The radar system of claim 7, wherein the first direction is approximately parallel to a ground surface and the second direction is approximately parallel to a direction of gravity.

9. A vehicle comprising:
   an automated driving system structured to autonomously control the vehicle to move in a first direction;
   a radar system operably connected to the automated driving system, the radar system comprising:
      a plurality of antenna elements spaced apart in a second direction different from the first direction; and
      a controller operably connected to the plurality of antenna elements; wherein the controller is configured to perform:
         recording signals received by each antenna element at each time instant of a plurality of time instants;
         calculating a position in the first direction of each antenna element for each time instant based on a velocity hypothesis;
         calculating a virtual two-dimensional antenna array response based on the signal received by each antenna element at each time instant and the position in the first direction of each antenna element at each time instant;
         calculating a beamforming spectrum based on the virtual two-dimensional antenna array response;
         identifying a peak in the beamforming spectrum to identify an elevation angle from the vehicle to a target relative to the first direction; and transmitting the elevation angle of the target to the automated driving system;
wherein the automated driving system is structured to control operation of the vehicle based on the elevation angle.

10. The vehicle of claim 9, wherein the controller is further configured such that the identifying a peak in the beamforming spectrum comprises:
calculating a velocity score of the beamforming spectrum;
iteratively adjusting the velocity hypothesis until an optimal velocity hypothesis is determined, the optimal velocity hypothesis being a velocity hypothesis for which the velocity score of the beamforming spectrum reaches an optimal velocity score, and an optimal beamforming spectrum being a beamforming spectrum generated using the optimal velocity hypothesis; and
identifying a peak in the optimal beamforming spectrum to identify the elevation angle.

11. A control method for use with a radar system in a vehicle moving in a first direction, the radar system comprising a plurality of antenna elements spaced apart in a second direction different from the first direction, the control method comprising:
recording signals received by each antenna element at each time instant of a plurality of time instants;
calculating a position in the first direction of each antenna element for each time instant based on a velocity hypothesis;
calculating a virtual two-dimensional antenna array response based on the signal received by each antenna element at each time instant and the position in the first direction of each antenna element at each time instant;
calculating a beamforming spectrum based on the virtual two-dimensional antenna array response; and
identifying a peak in the beamforming spectrum to identify an elevation angle from the vehicle to a target relative to the first direction.

12. The control method of claim 11, wherein the identifying a peak in the beamforming spectrum further comprises:
calculating a velocity score of the beamforming spectrum;
iteratively adjusting the velocity hypothesis until an optimal velocity hypothesis is determined, the optimal velocity hypothesis being a velocity hypothesis for which the velocity score of the beamforming spectrum reaches an optimal velocity score, and an optimal beamforming spectrum being a beamforming spectrum generated using the optimal velocity hypothesis; and
identifying a peak in the optimal beamforming spectrum to identify the elevation angle of the target relative to the first direction.

13. The control method of claim 12, wherein the velocity score is given by the equation:

$$S_E = E - \alpha \sum_i |s_i|^2$$

wherein $s_i$ is the beamforming spectrum at index i, $\alpha$ is a normalization factor, and E is given by the equation:

$$E = -\sum_i \gamma_i \log(\gamma_i)$$

wherein $\gamma_i$ is given by the equation:

$$\gamma_i = \frac{|s_i|^2}{\sum_i |s_i|^2}.$$

14. The control method of claim 12, wherein:
the vehicle comprises an automated driving system operably connected to the radar system, the automated driving system being structured to autonomously control the vehicle;
the control method further comprises transmitting the optimal velocity hypothesis to the automated driving system; and
the automated driving system is structured to control operation of the vehicle based on the optimal velocity hypothesis.

15. The control method of claim 12, wherein:
the vehicle comprises an automated driving system operably connected to the radar system, the automated driving system being structured to autonomously control the vehicle;
the control method further comprises transmitting the elevation angle to the automated driving system; and
the automated driving system is structured to control operation of the vehicle based on the elevation angle.

16. The control method of claim 11, wherein a pitch of the antenna elements in the second direction is equal to or larger than 10 times a wavelength of a radar signal transmitted by the radar system.

17. The control method of claim 11, wherein the second direction is approximately perpendicular to the first direction.

18. The control method of claim 17, wherein the first direction is approximately parallel to a ground surface and the second direction is approximately parallel to a direction of gravity.

19. The radar system of claim 1, wherein the controller is configured such that the identifying a peak in the beamforming spectrum comprises identifying a plurality of peaks in the beamforming spectrum to identify a plurality of elevation angles from the vehicle to a plurality of targets relative to the first direction.

20. The control method of claim 11, wherein the identifying a peak in the beamforming spectrum comprises identifying a plurality of peaks in the beamforming spectrum to identify a plurality of elevation angles from the vehicle to a plurality of targets relative to the first direction.

* * * * *